(12) United States Patent
Thomson et al.

(10) Patent No.: US 9,360,138 B2
(45) Date of Patent: Jun. 7, 2016

(54) UMBILICAL HOSE WITH IMPROVED CYCLIC OVALISATION RESISTANCE

(75) Inventors: Fraser Hynd Thomson, Kinross (GB); Richard Henry Norton, Cupar (GB)

(73) Assignee: OCEANEERING INTERNATIONAL SERVICES LIMITED, Fife (GB)

( * ) Notice: Subject to any disclaimer, the term of this patent is extended or adjusted under 35 U.S.C. 154(b) by 0 days.

(21) Appl. No.: 14/125,939

(22) PCT Filed: Jun. 13, 2012

(86) PCT No.: PCT/GB2012/000515
§ 371 (c)(1),
(2), (4) Date: Mar. 21, 2014

(87) PCT Pub. No.: WO2012/172289
PCT Pub. Date: Dec. 20, 2012

(65) Prior Publication Data
US 2014/0216592 A1 Aug. 7, 2014

(30) Foreign Application Priority Data
Jun. 13, 2011 (GB) .................... 1109876.1

(51) Int. Cl.
F16L 11/00 (2006.01)
F16L 11/02 (2006.01)
F16L 11/08 (2006.01)
F16L 11/22 (2006.01)

(52) U.S. Cl.
CPC ............... *F16L 11/02* (2013.01); *F16L 11/086* (2013.01); *F16L 11/22* (2013.01)

(58) Field of Classification Search
CPC .. F16L 11/088; F16L 11/11081; F16L 11/115
USPC ................. 138/123–125, 129, 130, 137, 140; 428/36.91
See application file for complete search history.

(56) References Cited

U.S. PATENT DOCUMENTS

| 4,699,178 | A | 10/1987 | Washkewicz |
| 6,435,217 | B1 | 8/2002 | Bertero et al. |
| 6,901,968 | B2 * | 6/2005 | Thomson ...................... 138/116 |
| 7,493,918 | B2 * | 2/2009 | Thomson ...................... 138/130 |
| 7,694,695 | B2 * | 4/2010 | Johnson et al. ............... 138/123 |
| 2004/0261876 | A1 * | 12/2004 | Warren et al. ................. 138/125 |
| 2006/0127620 | A1 | 6/2006 | Fisher |
| 2006/0144456 | A1 | 7/2006 | Donnison et al. |
| 2006/0232065 | A1 | 10/2006 | Burke et al. |
| 2008/0210329 | A1 | 9/2008 | Quigley et al. |

(Continued)

FOREIGN PATENT DOCUMENTS

EP 0582301 A1 2/1994
WO 2009156142 A1 12/2009

OTHER PUBLICATIONS

International search report and written opinion for application No. PCT/GB2012/000515 dated Sep. 11, 2012.

*Primary Examiner* — Patrick F Brinson
(74) *Attorney, Agent, or Firm* — Patterson & Sheridan, LLP

(57) ABSTRACT

A high pressure hose for use within an umbilical includes a hose liner tube surrounded by a first reinforcement layer comprised substantially of ultra high molecular weight polyethylene fibers and a second reinforcement layer surrounding the first reinforcement layer. The second layer comprises at least 50% aramid fibers. The hose has an outer thermoplastic extruded hose jacket.

11 Claims, 1 Drawing Sheet

(56) References Cited

U.S. PATENT DOCUMENTS

2009/0151805 A1   6/2009  Martino et al.
2009/0308475 A1*  12/2009 Stringfellow et al. .......... 138/98
2014/0202574 A1*  7/2014  Thomson ...................... 138/125

* cited by examiner

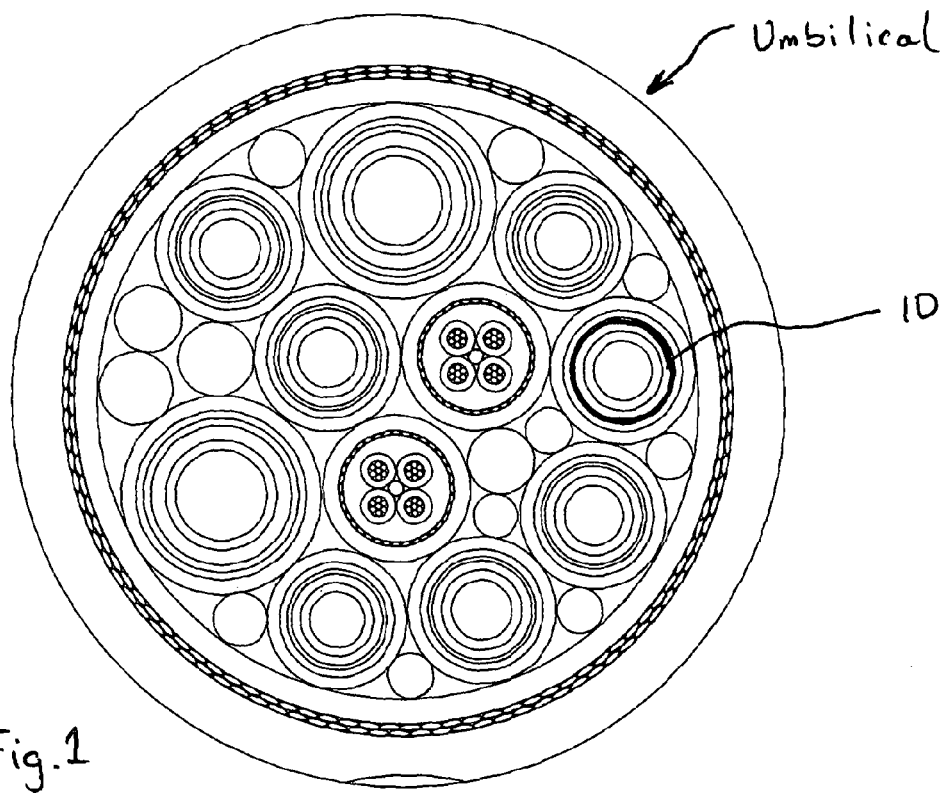
Fig. 1
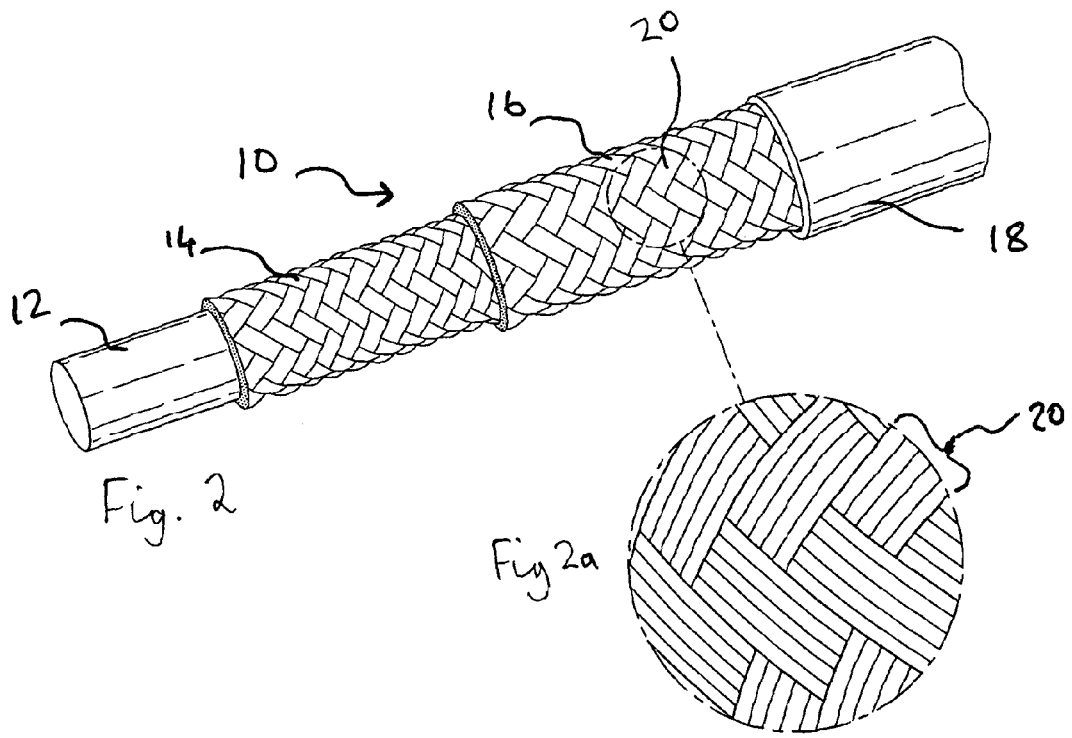
Fig. 2
Fig 2a

UMBILICAL HOSE WITH IMPROVED CYCLIC OVALISATION RESISTANCE

FIELD OF THE INVENTION

The present invention relates to a hose or conduit for transporting fluids, usually hyrdocarbon fluids or hydraulic fluids, and in particular to a conduit or hose which forms part of an umbilical, for use in offshore drilling environments.

BACKGROUND TO THE INVENTION

In offshore drilling environments it is necessary to supply hydraulic signals and fluids to the wellhead and the standard practice is to use a hydraulic sub-sea control umbilical hose for the purpose of the workover control where workover operations are performed on a sub-sea wellhead using a workover riser and/or for blow out preventer control and actuation. The standard practice has been to use a standard thermoplastic hydraulic subsea control umbilical hose, which umbilical hose contains a number of hoses for carrying fluid and may also carry electrical cabling and fibre optic cabling as required. Typically hoses and cables carried within an umbilical are of a multilayer reinforced structure such as are known in the art so that they have appropriate pressure containment, burst and compression resistance for the usage envisaged. An example of an umbilical of the type supplied by the applicant is shown in FIG. 1 in cross-section.

Normally these umbilicals are stored, deployed and recovered from hydraulic or air powered reels on the top side (for example on a ship or other offshore structure). Such umbilicals are deployed, operated and recovered through a route containing one, two or three sheaves (wheels or rollers) depending on the applications and heave compensation systems used. The umbilicals are subject to various tensile and bending loads during deployment, operation and recovery whilst paid off and paid onto a reel, over various sheaves, roller guides and heave compensation systems. In operation the umbilicals also experience fatigue motions (small movements to and fro) which are generally of a smaller displacement but with a higher cycle.

Typically an umbilical when operating can either be static or moving through a roller sheave and may experience tension in the region of 5-20 kN. At the points where the umbilical makes contact with the sheaves or rollers the alternating and/or constant operating tensile loads within the umbilical are supported and absorbed. The contact loads between the rollers and the umbilical act on a small area of the umbilical and the rollers which results in high and varying contact pressures and deformation and ovalisation of the umbilical as the umbilical attempts to resist these loads. It will be understood that as the umbilical passes through the multiple roller sheaves it makes repeated intermittent contact with the rollers which results in differing deformation at any given location along an umbilical.

It has been found that the repeated/cyclic deformation of the umbilical outer jacket translates and passes into the individual hoses within the umbilical core.

Typically the hoses are high pressure thermoplastic hoses which have hose reinforcement layers. The contact forces and aforementioned ovalisation damage the hose pressure containment reinforcement layers due to lateral cyclic compression forces and fibre abrasion between adjacent fibres and the polymers of the pipe core tube and/or the outer jacket occurs due to the relative movement whilst under tensile and lateral compressive loads. This ovalisation and associated damage can result in the hose pressure containment capacity reducing significantly from up to four times that of the working pressure of the hose to levels around actual working pressure such that hose failure may occur in the field during operation when significant operational umbilical life has been consumed. It has been found that this ovalisation and gradual degradation is not linear but exponentially more aggressive at the start of the operational life of an umbilical.

Conventional hoses used in umbilicals generally comprise a hose liner core tube, typically of Nylon 11 or polyethylene which is surrounded by an inner braided layer and an outer braided layer, around which a hose outer jacket is extruded, typically nylon or polyethylene. The braided layers (inner and outer), which provide the appropriate pressure containment, burst and compression resistance are made from braided layers of high strength fibre, typically aramid fibres. Aramid fibres are used extensively in underwater applications, such as umbilicals and hoses, as they provide the required mechanical properties including good axial stiffness and tensile strength. Aramids however have generally poor self abrasion resistance (fibre to fibre) as well as poor abrasion resistance to hose liner core tube materials.

It is an object of the present invention to provide an improved hose for use within an umbilical which avoids or minimises one or more of the aforementioned disadvantages of known systems.

DESCRIPTION OF THE INVENTION

According to a first aspect the present invention provides a high pressure hose for use within an umbilical, the high pressure hose comprising:

a hose liner core tube; surrounded by a first reinforcement layer comprised substantially of ultra high molecular weight polyethylene (UHMWPE) fibres; a second reinforcement layer surrounding said first reinforcement layer, said second layer comprising fibres, at least 50% of which are aramid; and an outer thermoplastic extruded hose jacket.

The second reinforcement layer may be comprised substantially of aramid fibres.

Advantageously the first and second reinforcement layers are in contact with each other i.e. the second reinforcement layer is laid directly onto the first reinforcement layer.

Thus with the high pressure hose according to the present invention there may be provided improved performance over known types of high pressure hoses, of the type used in umbilicals.

The first reinforcement layer may consist essentially of, or consist of, ultra high molecular weight polyethylene (UHMWPE) fibres. Similarly the second reinforcement layer may consist essentially of, or consist of aramid fibres. However other fibres may be included in the layers. The first reinforcement layer may typically consist of ultra high molecular weight polyethylene (UHMWPE) fibres. The second reinforcement layer may typically have fibres other than aramid present. For example the second reinforcement layer may have 50% or more aramid fibres with other fibres constituting the remaining content.

Preferably the hose core liner tube is made from Nylon 11 or polyethylene, usually an extruded tube.

Preferably the first reinforcement layer of ultra high molecular weight polyethylene fibres is a braided layer, desirably wherein there is a plurality of individual strands arranged together and braided together.

Advantageously the fibres of the first reinforcement layer have improved abrasion resistance in comparison to conventional aramid fibres and a particularly desirable fibre is an ultra high molecular weight polyethylene such as Spectra® and Dyneema® spun fibres available from Honeywell speciality materials and Royal DSM MV respectively. These fibres have higher creep resistance level to that of conventional aramid fibres which have unsuitable impulse and volumetric expansion performance characteristics for applications of this type.

What surprisingly the inventors have found is that with a conventional inner and outer braided reinforcement layer of aramid the load share between the inner and outer layers is poor. However by using UHMWPE fibres on the first reinforcement layer and an aramid fibre second layer, the burst pressure of the hose actually increases. Thus it is preferred that the fibre used in the first reinforcement layer has a higher creep resistance to the fibres used in the second layer. Thus there is preferably produced a more efficient hose in terms of load share as well as a more robust hose with significantly improved resistance to ovalisation with consequential longer design life and reliability as a result of higher burst pressures.

The hose is particularly useful in applications such as the sub-sea applications discussed above under the heading Background to the Invention. Even when protected inside an umbilical casing, hoses for sub-sea use are subject to substantial, typically cyclic, ovalisation forces. The hoses described herein can show exceptional fatigue performance when subject to repeated ovalisation.

Preferably said first reinforcement layer comprised of substantially high molecular weight polyethylene fibres may include a mixture of untwisted or twisted fibres. It may also include strands of aramid, all twisted together with high molecular weight polyethylene fibres to form a single strand which may then be wound either helically or preferably in a braided arrangement. Typically the reinforcement layers are applied in either a contra helical lay using a spiral winder planetary lay up machine or, where a braided construction is desired, by using a maypole braiding machine.

Preferably the fibres are arranged in groups of fibre yarns, typically five fibre yarns laid side by side. Preferably each pitch or lay length of the helix of a group of fibre yarns in a layer of fibre reinforcement are adjacent and in contact with each other such that when applied to the hose core liner tube the tensile strength and fatigue performance of the finished hose can be maximised.

Typically the lay angle of the groups of fibre yarns is between 15 and 30 degrees with respect to the axial direction of the hose.

In order to provide sufficient burst pressure the first reinforcement layer provides for 100% coverage of the hose core liner tube. Preferably the second layer surrounding the first layer has 100% coverage. The second layer of aramid fibres may also comprise strands of UHMWPE material however such materials have a low ability to withstand heat and a subsequent low melting point so it is desirable to minimise the use of such materials as the outer hose jacket is a thermoplastic which is hot extruded onto the second layer.

Hoses of the invention may have other layers present, for example to provide further reinforcement or chemical resistance etc. However hoses consisting of just the four layers:
 a hose liner tube;
 surrounded by a first reinforcement layer comprised substantially of, consisting essentially of, or consisting of ultra high molecular weight polyethylene fibres;
 a second reinforcement layer surrounding said first reinforcement layer, said second layer comprising fibres at least 50% of which are aramid (optionally the second layer is comprised substantially of, consisting essentially of, or consisting of aramid fibres); and
 an outer thermoplastic extruded hose jacket; can be economic in manufacture, compact and durable.

BRIEF DESCRIPTION OF THE DRAWINGS

FIG. 1 shows in schematic cross section an umbilical including a high pressure hose of the invention; and
FIG. 2 shows a high pressure hose of the invention.
Figure 2a shows an enlarged partial view of FIG. 2.

DESCRIPTION OF THE DRAWINGS

A preferred embodiment of the high pressure hose according to the present invention will now be described with reference to FIG. 2 of the accompanying drawings which shows the component parts of the hose.

In more detail FIG. 2 shows a high pressure hose for use within an umbilical (of the type shown in FIG. 1). The hose, generally indicated by reference number 10 comprises a hose core liner tube of polyethylene (12); The liner tube 12 being surrounded by a first reinforcement layer 14 comprised of ultra high molecular weight polyethylene fibres in a braided arrangement providing 100% coverage to the liner tube 12. The first reinforcement layer 14 is surrounded by a second reinforcement layer 16 which is comprised of aramid fibres arranged in a braided manner. For the avoidance of doubt each of the braided elements indicated by reference number (20) comprises a number of individual strands, typically four or five strands. See detail in FIG. 2a.

The first and second layers are then surrounded by an outer thermoplastic extruded hose jacket of polyethylene 18.

Various modification may be made to the above described embodiment without departing from the scope of the present invention and thus for example there could be included a third reinforcement layer comprised of aramid fibres arranged in a braided manner which would then be encapsulated by the thermoplastic extruded hose jacket.

The invention claimed is:

1. A high pressure ovalisation resistant hose for use within an umbilical, the high pressure hose comprising: a hose liner tube; surrounded by a first reinforcement layer comprised substantially of ultra high molecular weight polyethylene fibres; a second reinforcement layer surrounding said first reinforcement layer, wherein the second reinforcement layer is laid directly onto and in contact with the first reinforcement layer, and said second layer comprising fibres, at least 50% of which are aramid; and an outer thermoplastic extruded hose jacket.

2. A high pressure ovalisation resistant hose as claimed in claim 1 wherein the second reinforcement layer is comprised substantially of aramid fibres.

3. A high pressure ovalisation resistant hose as claimed in claim 1 wherein the first reinforcement layer consists essentially of ultra high molecular weight polyethylene fibres.

4. A high pressure ovalisation resistant hose as claimed in claim 1 wherein the first reinforcement layer is a braided layer.

5. A high pressure ovalisation resistant hose as claimed in claim 1 wherein the second reinforcement layer is a braided layer.

6. A high pressure ovalisation resistant hose as claimed in claim 1 wherein the first and second reinforcement layers provide 100% coverage.

7. A high pressure ovalisation resistant hose as claimed in claim 1 wherein the fibres of said first or second reinforcement layer are arranged in groups of fibre yarns, laid side by side.

8. A high pressure ovalisation resistant hose as claimed in claim 1 where the first reinforcement layer includes strands of aramid fibre.

9. A high pressure ovalisation resistant hose as claimed in claim 1 wherein said second reinforcement layer includes strands of ultra high molecular weight polyethylene fibres.

10. An umbilical for use in offshore drilling environments including at least one of a high pressure ovalisation resistant hose according to claim 1.

11. A high pressure ovalisation resistant hose as claimed in claim 1 wherein the second reinforcement layer consists essentially of aramid fibers.

\* \* \* \* \*